(No Model.)
T. C. VAN NESS.
HAME.
No. 361,032. Patented Apr. 12, 1887.
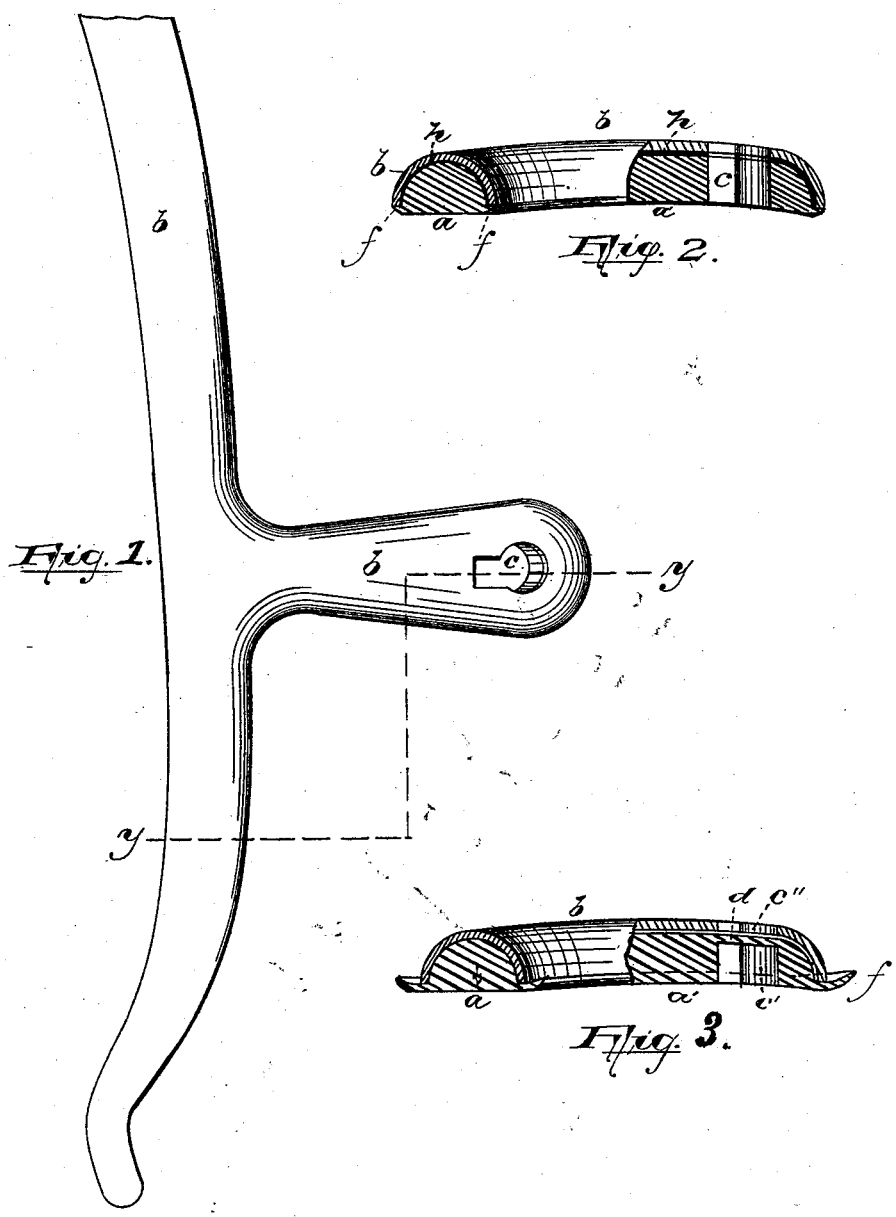
WITNESSES: Wm P. Reed, Fredk. P. Campbell.
INVENTOR: Thomas C. Van Ness, BY Drake & Co., ATTYS

UNITED STATES PATENT OFFICE.

THOMAS E. VAN NESS, OF VAILSBURG, NEW JERSEY.

HAME.

SPECIFICATION forming part of Letters Patent No. 361,032, dated April 12, 1887.

Application filed February 24, 1886. Serial No. 192,986. (No model.)

*To all whom it may concern:*

Be it known that I, THOMAS E. VAN NESS, a citizen of the United States, residing at Vailsburg, in the county of Essex and State of New Jersey, have invented certain new and useful Improvements in Hames; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to reduce the cost of ornamenting hames, to secure increased durability of finish, and to render more perfect the union of parts.

The invention consists in the arrangements and combinations of parts, substantially as will be hereinafter set forth, and finally embodied in the clauses of the claim.

Referring to the accompanying drawings, in which like letters indicate corresponding parts in each of the figures, Figure 1 is a plan of a portion of a completed hame. Fig. 2 is a section of the same taken through line $y$, and Fig. 3 is a sectional view showing the same in course of manufacture.

In said drawings, $a$ indicates the body of the hame, and $a'$ the body of the draft-eye.

$b$ is a cap or covering for the draft eye or arm and the adjacent portions of the hame, the said cap or covering being grooved on the under side in conformity to the shape of said body portions, the groove for the draft-eye body lying approximately at right angles to that for the body of the hame. The body portions $a$ $a'$ are of cheap metal—such as iron—while the covering or cap is of a more expensive metal—such as sheet-brass. The cap being given the desired shape, the parts are placed together and brazed fast, the line of brazing being indicated at $h$, Fig. 2.

The preferred method of brazing, by means of which I secure a perfect union of parts and in consequence increased strength and beauty of finish, is substantially as follows:

To secure a perfect union of parts at the eye, so that the joint appearing to view in the said eye will show no defects, I first strike out the eye-recess $c'$, Fig. 3, so that it extends but partly through the draft-arm body $a'$, and leaves a film, web, or scale of metal, $d$, at the outer face of said portion $a'$. This is so thin that it is easily punched out after the cap is brazed without disturbing or injuring the perfect union of parts. The cap which has been perforated is then placed in position on the body portion, so that a cup-like receptacle, $c''$, is formed, into which the grains of hard solder or brazing metal are placed. The parts $a'$ $b$, together with the said brazing metal, are then heated and the said brazing metal melted, so that it runs into the joint and unites the parts perfectly together, the brazing metal filling the joint, so that when finished it presents no defects to view. The other joints or portions of the joints may be finished in any ordinary manner; but I prefer, and especially so when the cap covers the whole hame-body, as in Fig. 1, to form at the lateral edges of both or either of the body portions $a$ $a'$ a flange, $f$, which may be straight or curved, as in Fig. 3, to form a receptacle or groove, upon which the grains of brazing metal are placed. The parts being heated, as before, the molten metal enters the adjacent joints and unites the parts together, the joint being perfect, as in the first case. The parts being brazed, the film $d$ is punched through, making a finished eye, $c$, and the projecting portion of the flange is buffed off or otherwise removed, as in Fig. 2, the under edge being rounded off, so that an iron edge will not appear to view. The remaining portion of the flange, underlying the edge of the sheet metal, serves to protect the same, so that it cannot be torn off or otherwise injured or the edge broken, as will be evident, the said remaining portion, so far as protecting the edges of the cap is concerned, acting as a complete flange, as will be evident.

Having thus described the invention, what I claim as new is—

The combination, with the metallic hame-body having flanges $f$, of a cap or covering, $b$, having its edges protected by said flanges, substantially as set forth.

In testimony that I claim the foregoing I have hereunto set my hand this 15th day of February, 1886.

THOMAS E. VAN NESS.

Witnesses:
 FREDK. F. CAMPBELL,
 CHARLES H. PELL.